(12) United States Patent
Weidhaus et al.

(10) Patent No.: US 7,708,828 B2
(45) Date of Patent: May 4, 2010

(54) DUST-FREE AND PORE-FREE, HIGH-PURITY GRANULATED POLYSILICON

(75) Inventors: Dieter Weidhaus, Burghausen (DE); Ivo Crössmann, Burghausen (DE); Franz Schreieder, Tann (DE)

(73) Assignee: Wacker-Chemie GmbH, Munich (DE)

( * ) Notice: Subject to any disclaimer, the term of this patent is extended or adjusted under 35 U.S.C. 154(b) by 1268 days.

(21) Appl. No.: 11/010,525

(22) Filed: Dec. 13, 2004

(65) Prior Publication Data

US 2005/0135986 A1   Jun. 23, 2005

(30) Foreign Application Priority Data

Dec. 18, 2003 (DE) ................ 103 59 587

(51) Int. Cl.
  C01B 33/03  (2006.01)
  C01B 33/027 (2006.01)
  C01B 33/02  (2006.01)
  C30B 21/06  (2006.01)
  C30B 27/02  (2006.01)
  C30B 28/10  (2006.01)
  B29C 41/24  (2006.01)
  B29C 43/22  (2006.01)
  B29D 7/01   (2006.01)

(52) U.S. Cl. ............. 117/13; 264/165; 264/219; 423/348; 423/349; 428/402

(58) Field of Classification Search ........... 423/348, 423/335, 342, 343, 349, 350; 427/213; 118/716; 422/139, 145, 146; 264/165, 219; 117/13; 428/402

See application file for complete search history.

(56) References Cited

U.S. PATENT DOCUMENTS 4,661,335 A    4/1987  Boudot et al.

(Continued)

FOREIGN PATENT DOCUMENTS

DE    3638931 C2    3/1990

(Continued)

OTHER PUBLICATIONS

Weidhaus et al., "Granular Polysilicon Deposition from Trichlorosilane Using a Fluidized Bed Reactor," Jun. 7-11, 2004, 19th European Photovoltaic Energy Conference, Paris, France, pp. 564-567.*

(Continued)

Primary Examiner—Wayne Langel
Assistant Examiner—Brittany M Martinez
(74) Attorney, Agent, or Firm—Collard & Roe, P.C.

(57) ABSTRACT

A polycrystalline granulated silicon is made of particles which have a density of greater than 99.9% of the theoretical solid density and therefore have a pore content of less than 0.1% and have a surface roughness $R_a$ of less than 150 nm.

11 Claims, 2 Drawing Sheets

U.S. PATENT DOCUMENTS

| | | | |
|---|---|---|---|
| 4,786,477 A | | 11/1988 | Yoon et al. |
| 4,820,587 A | | 4/1989 | Gautreaux et al. |
| 4,851,297 A | | 7/1989 | Allen et al. |
| 4,868,013 A | * | 9/1989 | Allen .......................... 427/213 |
| 4,883,687 A | | 11/1989 | Gautreaux et al. |
| 5,077,028 A | | 12/1991 | Age |
| 5,139,762 A | * | 8/1992 | Flagella ..................... 423/349 |
| 5,242,671 A | | 9/1993 | Allen et al. |
| 5,405,658 A | * | 4/1995 | Ibrahim et al. .............. 427/588 |
| 5,798,137 A | * | 8/1998 | Lord et al. .................. 427/213 |
| 5,810,934 A | * | 9/1998 | Lord et al. .................. 118/725 |
| 6,007,869 A | | 12/1999 | Schreieder et al. |
| 7,029,632 B1 | * | 4/2006 | Weidhaus et al. ........... 422/139 |
| 2004/0042950 A1 | * | 3/2004 | Mleczko et al. ............. 423/349 |

FOREIGN PATENT DOCUMENTS

| | | | |
|---|---|---|---|
| DE | 4201546 A1 | * | 7/1992 |
| DE | 10124848.2 | * | 5/2001 |
| DE | 19948395 A1 | | 5/2001 |
| EP | 0896952 A | | 2/1999 |
| JP | 05-024968 | | 2/1993 |
| JP | 05024968 A | | 2/1993 |
| JP | 05-319989 | | 12/1993 |
| JP | 05319989 A | | 12/1993 |
| JP | 06-127918 | * | 5/1994 |
| WO | WO 96/41036 | | 12/1996 |

OTHER PUBLICATIONS

W. Zulehner;. Silicon; Ullmann's Encyclopedia of Industrial Chemistry, online-publication; 23 Pages, 2002,Wiley-VCH Velag.

A. Kozdon'; H. Wagenbreth,D. Hoburg;.Density difference measurements on silicon single-crystals by the temperature-of-flotation method, 1990,44 Pages.

Patent Abstract of JP corresponding to JP 05024968 A.

Patent Abstract of JP corresponding to JP 05319989 A.

M.P. Dudukovic, pp. 183-186, of R. Lutwack and A. Morrison, Noyes Publication 1994.

H. Y. Kim, Chemical Industry and Technology, 14 (1) : pp. 50-58 (1996), Partial English translation.

M. Kuramoto, Chemical Engineering (Japan), 55 (11) : pp. 862-867(1991),Partial English language Translation.

H.Y. Kim, Proceedings of $1^{st}$ theme, the $69^{th}$ Academy-Research Institute-Ind. Symposium ,Korea Science Foundation, Daejeon, Korea, May 21, 1992, partial Eng. transl.

W.C. O'Mara et al., pp. 640-730, Noyes Publications (1990).

J. Jananmir et al. SPIE, 1720 : pp. 111-118 (1992).

W. Hiliger, Technical papers, $8^{th}$ ECDNT Barcelona 2002.

M. Zecchino, Veeco Instruments, Inc., 2003 (http://www.veeco.com/appnotes/AN511_Roughness.pdf).

S. J. Fang et al., Journal of the Electrochemical Soc., 146 (3) : pp. 1158-1162 (1999).

* cited by examiner

10μm

10μm

DUST-FREE AND PORE-FREE, HIGH-PURITY GRANULATED POLYSILICON

CROSS REFERENCE TO RELATED APPLICATIONS

Applicants claims priority under 35 U.S.C. §119 of German Application No. 103 59 587.2 filed Dec. 18, 2003.

BACKGROUND OF THE INVENTION

1. Field of the Invention

The present invention relates to a dust-free and pore-free, high-purity granulated polysilicon, to its production and its use.

2. The Prior Art

Granulated polysilicon is an alternative to the polysilicon produced using the Siemens process. The polysilicon produced in the Siemens process is in the form of a cylindrical rod of silicon which has to be broken up to form what is known as chip poly. If it is appropriately purified again, this is a time-consuming and expensive process. Prior to further processing, granulated polysilicon has bulk material properties and can be used directly as raw material, e.g. for the production of single crystals for the photovoltaics and electronics industry.

Granulated polysilicon is produced in a fluidized bed reactor. It is produced by fluidizing silicon particles by means of a gas flow in a fluidized bed, the latter being heated to high temperatures by means of a heating apparatus. The addition of a silicon-containing reaction gas causes a pyrolysis reaction to take place at the hot particle surface. Elemental silicon is deposited on the silicon particles, and the diameter of the individual particles grows. The regular extraction of grown particles and addition of smaller silicon particles as seed particles allows the process to be operated continuously, with all the associated benefits. Silicon-containing starting gases described include silicon-halogen compounds (e.g. chlorosilanes or bromosilanes), monosilane ($SiH_4$) and mixtures of these gases with hydrogen. Deposition processes of this type and corresponding apparatuses are known, for example, from WO 96/41036, DE 3638931 C2 (corresponding to U.S. Pat. No. 4,786,477) or DE 199 48 395 A1.

The granulated silicon obtained from the deposition process is distinguished by a high purity, i.e. a low level of dopants (in particular boron and phosphorus), carbon and metals.

U.S. Pat. No. 4,883,687 has disclosed granulated silicon which is defined on the basis of the grain size distribution, the boron, phosphorus and carbon contents, the surface dust content, its density and bulk density.

U.S. Pat. No. 4,851,297 has described a doped granulated polysilicon, and U.S. Pat. No. 5,242,671 has described a granulated polysilicon with a reduced hydrogen content.

U.S. Pat. No. 5,077,028 describes a process in which a granulated polysilicon which is distinguished by a low chlorine content is deposited from a chlorosilane.

The granulated polysilicon which is currently produced on a large scale has a porous structure, resulting in two serious disadvantageous properties:

Gas is included in the pores. This gas is released during melting and disrupts the further processing of the granulated polysilicon. It is therefore attempted to reduce the gas content of the granulated polysilicon. However, as described in U.S. Pat. No. 5,242,671, this requires an additional working step, which increases production costs and, moreover, results in additional contamination of the granulated polysilicon.

The granulated polysilicon is not particularly resistant to abrasion. This means that fine silicon dust is formed during handling of the granulated polysilicon, e.g. when it is being transported to the user. This dust is disruptive in a number of ways:

it interferes with the further processing of the granulated polysilicon, since it floats when the granulated polysilicon is being melted;

it interferes with transportation of the granulated polysilicon within the production installation, since it causes deposits to form on pipelines and leads to blockages in valves and fittings;

it is a potential contamination carrier on account of its large specific surface area.

The abrasion leads to losses even during production of the granulated polysilicon in the fluidized bed.

The production based on monosilane as silicon-containing starting gas, is currently customary. In addition to the abrasion in the deposition process, this disadvantageously also results in the direct formation of dust as a result of a homogeneous gas phase reaction followed by recrystallization.

Although some of this ultrafine dust can be separated from the product, this also entails additional work, loss of material and therefore increased costs.

SUMMARY OF THE INVENTION

It is an object of the present invention to provide a polycrystalline granulated silicon which does not have the drawbacks of the known granulated polysilicon.

The above object is achieved according to the present invention by providing polycrystalline granulated silicon which is composed of particles which have a density of greater than 99.9% of the theoretical solid density and therefore have a pore content of less than 0.1% and a surface roughness $R_a$ of less than 150 nm.

It is preferable for the particles to have a surface roughness $R_a$ of less than 100 nm. By contrast, granulated silicon according to the prior art has a surface roughness $R_a$ of approximately 250 nm.

In this context, the surface roughness is determined by measurement using white light interferometry and corresponding assessment in accordance with EN ISO 4287.

The high homogeneity of the granulated silicon according to the invention resulting from the abovementioned features leads to the material being highly resistant to abrasion. Therefore, relatively little dust is formed during handling of the material.

The polycrystalline granulated silicon preferably has a bulk density of between 1200 $kg/m^3$ and 1550 $kg/m^3$, preferably between 1350 $kg/m^3$ and 1550 $kg/m^3$.

The particles of the granulated silicon are preferably spherical in form and have a grain diameter of 100-3000 µm, preferably from 300 to 2000 µm.

It is preferable for more than 80% by weight, particularly preferably more than 85% by weight, of the particles of the granulated silicon to be "as grown". Up to a 100-fold magnification "as grown" particles do not show any signs of mechanical processing, i.e. no broken edges are visible.

It is preferable for the particles to have a phosphorus dopant content of less than 300 ppta, particularly preferably less than 150 ppta.

The particles preferably have a boron dopant content of less than 300 ppta, particularly preferably less than 100 ppta.

It is preferable for the particles to have a carbon content of less than 250 ppba, particularly preferably less than 100 ppba.

It is preferable for the particles to have a total content of the metals Fe, Cr, Ni, Cu, Ti, Zn and Na of less than 50 ppbw, particularly preferably less than 10 ppbw.

The granulated polysilicon according to the invention can preferably be produced in a radiation-heated fluidized bed reactor, as described in DE 19948395 A1.

It is preferable for the high-purity polycrystalline granulated silicon according to the invention to be produced by deposition of a reaction gas on silicon seed crystals in a fluidized bed. The reaction gas preferably consists of a mixture of hydrogen and halosilanes, particularly preferably of a mixture of hydrogen and trichlorosilane. The deposition is preferably carried out at a fluidized bed temperature in the reaction region of 700° C. to 1200° C. The seed crystals which are initially introduced in the fluidized bed are fluidized with the aid of a silicon-free fluidizing gas, preferably hydrogen, and heated by means of thermal radiation.

The thermal energy is introduced uniformly over the periphery of the fluidized bed by means of flat heating radiators. In the reaction zone, the silicon-containing reaction gas is deposited as elemental silicon on the silicon particles as a result of a CVD reaction. Unreacted reaction gas, fluidizing gas and gaseous reaction byproducts are removed from the reactor. Regular extraction of particles provided with the deposited silicon from the fluidized bed and addition of seed crystals allows the process to be operated continuously.

The temperature of the fluidized bed in the reaction region is preferably from 850° C. to 110° C., particularly preferably from 900° C. to 1050° C.

The reaction gas is preferably injected into the fluidized bed via one or more nozzles.

The pressure in the fluidized bed is preferably between 0.1 MPa and 1.1 MPa, particularly preferably between 0.15 MPa and 0.7 MPa, particularly preferably between 0.2 MPa and 0.5 MPa.

The concentration of the silicon-containing reaction gas, based on the total quantity of gas passed through the fluidized bed, is preferably from 10 mol % to 50 mol %, particularly preferably from 15 mol % to 40 mol %.

The concentration of the silicon-containing reaction gas in the reaction gas nozzle, based on the total quantity of gas passed through the reaction gas nozzles, is preferably from 20 mol % to 50 mol %.

The mean residence time of the reaction gas in the fluidized bed is preferably from 100 ms to 2 s, preferably more than 150 ms up to 1.5 s, particularly preferably more than 200 ms up to 1.5 s.

The fluidized bed is preferably operated as a bubble-forming fluidized bed. A slugging mode, in which bubbles in the fluidized bed grow up to the diameter of the fluidized bed and then displace compacted fluidized bed material upward as a solid slug until the bubbles collapse, is preferably avoided by measures such as, for example, the selection of a minimal ratio of bed height to bed diameter (flat bed) or by arranging mechanical bubble breakers in the fluidized bed.

Only a small amount of dust is formed during production of the granulated polysilicon according to the invention. This together with the reduced abrasion leads to increased yields, since scarcely any fine dust is discharged from the fluidized bed, whereas in known processes such dust always leads to a loss of material. The further problems which have already been mentioned and are associated with the formation of dust also do not occur with the granulated silicon according to the invention. On account of the low level of pores in the granulated silicon, there is no need for a "degassing stage" as described, for example, in U.S. Pat. No. 5,242,671. This applies in particular when using trichlorosilane as starting gas, as well as dilution with hydrogen and a procedure as has been described as being preferred (pressure, temperature, no slugging).

When producing granulated silicon, the fine fraction can be screened off from the product and returned to the reactor. In this case, depending on the separating limit, the proportion of particles with broken edges in the granulated silicon according to the invention can be reduced to very low levels (<5%, preferably <1%). Thus, more than 95% by weight, particularly preferably more than 99% by weight, of the particles of a granulated silicon of this type do not have broken edges. The material according to the invention has advantages when the granulated polysilicon is used, for example, for multicrystalline ingot casting, for sheet pulling or for single crystal pulling. Process problems, such as poor melting rates, floating dust, blockage of feed valves and fittings by fine dust, no longer occur. Problems such as the degassing during melting of the material, which lead to bubbling and splashing at the melt surface, are avoided.

The granulated silicon according to the invention therefore allows problem-free further processing, for example to produce products for photovoltaics or electronics. It is particularly suitable for the disruption-free production of multicrystalline silicon ingots, for example by means of ingot casting;

of multicrystalline silicon sheets, for example by means of tape casting (e.g. Silicon-Film™ or "RFG" process) or by means of tape pulling (e.g. "EFG" process);

of monocrystalline crystals, for example using the CZ or FZ process, for the photovoltaics and electronics industries.

The invention therefore also relates to the use of the granulated silicon according to the invention for the abovementioned purposes.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention, in which.

DETAILED DESCRIPTION OF PREFERRED EMBODIMENTS

Figure 1:
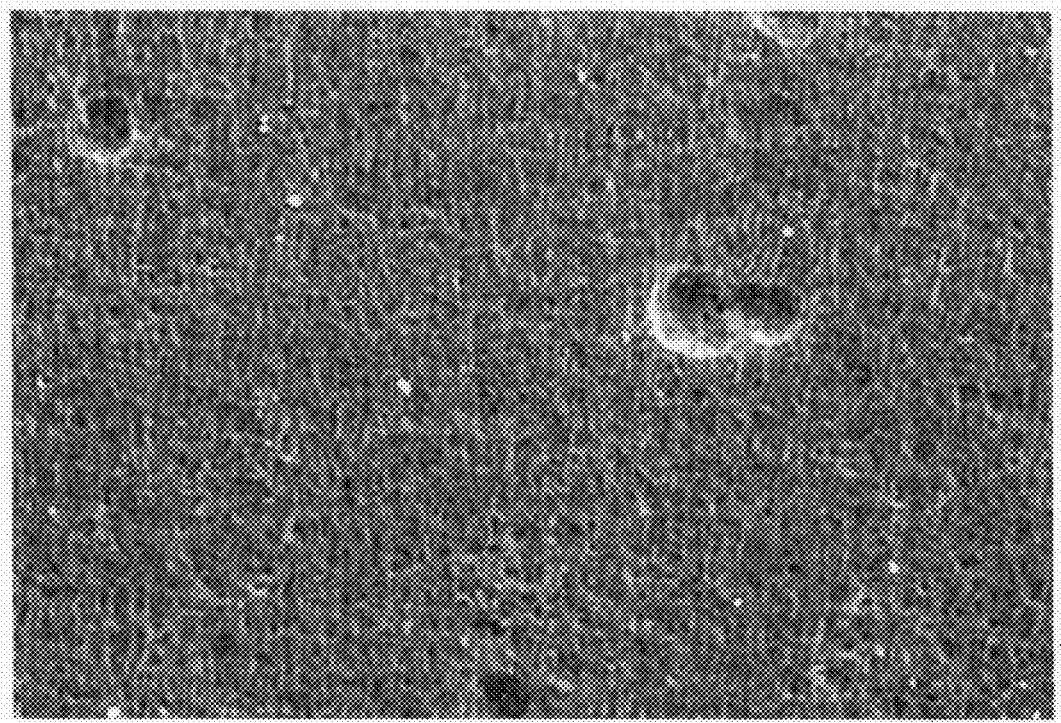
FIG. 1 shows a 2000 times magnification scanning electron microscope image of a surface-etched microsection (80 sec. $HF/HNO_3$ 1:11) of a granulated polysilicon according to the invention produced in Example 1.
Figure 2:
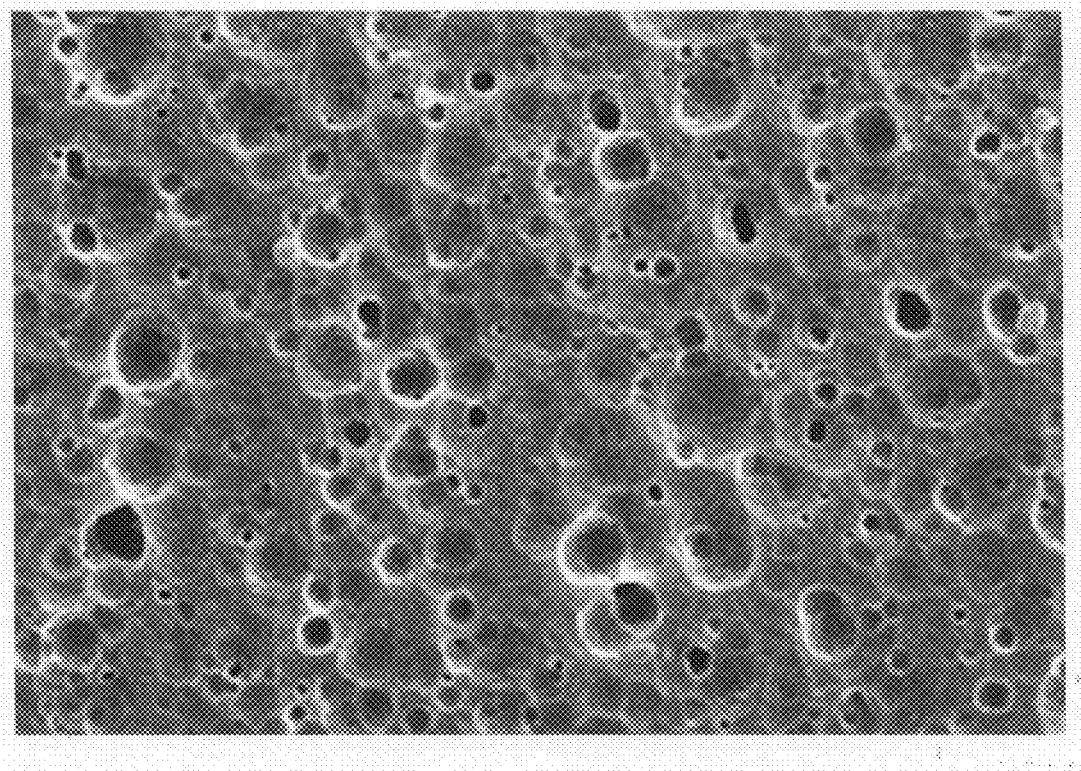
FIG. 2 shows a 2000 times magnification scanning electron microscope image of a microsection of a granulated polysilicon after surface etching (80 sec. $HF/HNO_3$ 1:11) produced in a process based on silane ($SiH_4$), commercially available from MEMC Pasadena Inc. under the reference "Dehydrogenated".

The high homogeneity of the particles of the granulated silicon according to the invention manifests itself when the scanning electron microscope (SEM) images of granulated silicon according to the invention (from Example 1) and granulated silicon according to the prior art are compared. The different structure is clearly apparent when the pre-etched microsections are viewed.

EXAMPLE

The following example serves to further illustrate the present invention, without being deemed a limitation in any manner thereof.

Example 1

The reactor structure substantially corresponds to the reactor structure disclosed by DE 19948395 A1. Therefore, for the reactor structure, reference is made to that document, in particular the examples. Granulated silicon with a grain size distribution of from 150 μm to 1000 μm was introduced in a quartz tube with an internal diameter of 204 mm and a height of 2000 mm. This bulk bed was fluidized using hydrogen through nozzles located at the reactor base and was heated by means of a radiant heater cylindrically surrounding the quartz tube. A reaction gas mixture consisting of hydrogen and trichlorosilane is injected into the fluidized bed via a reaction gas nozzle ending 200 mm above the bottom gas injection. Hydrogen and trichlorosilane are used in the purity customary for the semiconductor industry.

The following steady-state process conditions were set:

Bed weight 27 kg, corresponding to a fluidized bed height of approximately 0.55 m above the reaction gas injection;

Fluidized bed temperature: 950° C.;

Process pressure: 0.18 MPa;

Inert gas passed through the bottom nozzles: 13.7 m³/h (standard conditions) of hydrogen; reaction gas through the central reaction gas nozzle: 27.5 kg/h of trichlorosilane and 7 m³/h (standard conditions) of hydrogen.

This results in a trichlorosilane concentration of 39 mol % in the reaction gas nozzle and on average 19 mol % taken over the total gas stream.

The reactor was operated with a radiation efficiency of 27 kW at the fluidized bed temperature indicated under steady-state conditions, with the bed weight being kept approximately constant by cyclical extraction of granulated material from the fluidized bed. The cyclical addition of fine silicon seed crystals with a grain size distribution of from 150 μm to 500 μm stabilized the grain size distribution within the fluidized bed. Throughout the entire deposition time, the fluidized bed was operated as a bubble-forming fluidized bed without any sign of slugging.

In total, in this test 420 kg of silicon were deposited in 384 hours, corresponding to a mean deposition rate of 1094 g/h.

Material samples from this test were tested for density, surface roughness and concentrations of foreign substances:

Dopants were determined on monocrystalline samples in accordance with ASTM F1389-00.

Carbon was determined on monocrystalline samples in accordance with ASTM F1391-93(2000).

The metals which are usually specified (Fe, Cr, Ni, Cu, Zn, Na) were determined using ICP-MS analogously to ASTM F1724-01.

The solid density was measured using the temperature floatation method for density determination; the calculation was carried out in accordance with A. Kozdon, H. Wagenbreth, D. Hoburg: *Density Difference Measurements On Silicon Single-Crystals By The Temperature-Of-Flotation Method*. PTB report PTB-W-43, Braunschweig, 1990.

The surface roughness was determined by measurement using white light interferometry and corresponding analysis in accordance with EN ISO 4287.

The particles of the granulated material had the following properties:

| | |
|---|---|
| Density: | $\rho = 2328.4$ kg/m³ ± 2.0 kg/m³ |
| Surface roughness: | $R_a = 87.8$ nm ± 34.4 nm |
| Metal concentration: | 10.4 ng/g ± 1.0 ng/g (ng/g = ppbw) |
| Dopant concentration: | 207 ppta B ± 15 ppta B |
| | 220 ppta P ± 34 ppta P |
| Carbon concentration: | 87 ppba C ± 9 ppba C |

FIG. 1 shows a surface-etched microsection of the material.

Accordingly, while only a few embodiments of the present invention have been shown and described, it is obvious that many changes and modifications may be made thereunto without departing from the spirit and scope of the invention.

What is claimed is:

1. A polycrystalline granulated silicon consisting essentially of particles which have a surface roughness $R_a$ of less than 150 nm, a density of greater than 99.9% of a theoretical solid density of silicon and a pore content of less than 0.1%.

2. The polycrystalline granulated silicon as claimed in claim 1, wherein the particles have a surface roughness $R_a$ of less than 100 nm.

3. The polycrystalline granulated silicon as claimed in claim 1, which has a bulk density of between 1300 kg/m³ and 1550 kg/m³.

4. The polycrystalline granulated silicon as claimed in claim 1, wherein the particles are spherical in form and have a grain diameter of 100-3000 μm.

5. The polycrystalline granulated silicon as claimed in claim 4, wherein the particles are spherical in form and have a grain diameter from 300 to 2000 μm.

6. The polycrystalline granulated silicon as claimed in claim 1, wherein more than 80% by weight, of the particles are without visible signs of mechanical processing.

7. The polycrystalline granulated silicon as claimed in claim 6, wherein more than 85% by weight, of the particles are without broken edges.

8. The polycrystalline granulated silicon as claimed in claim 1, wherein the particles have a particle size of between 100 μm and 3000 μm, a phosphorus dopant content of less than 300 ppta, a boron dopant content of less than 300 ppta, a carbon content of less than 250 ppba, and a total content of the metals Fe, Cr, Ni, Cu, Ti, Zn, and Na of less than 50 ppbw.

9. The polycrystalline granulated silicon as claimed in claim 8, wherein the particles have a particle size of between 300 μm and 2000 μm, a phosphorus dopant content of less than 150 ppta, a boron dopant content of less than 100 ppta, a carbon content of less than 100 ppba, and a total content of the metals Fe, Cr, Ni, Cu, Ti, Zn, and Na of less than 10 ppbw.

10. In a method for the production of a multicrystalline silicon ingot or a multicrystalline silicon sheet or a monocrystalline silicon crystal, the improvement which comprises utilizing the polycrystalline granulated silicon of claim 1 for said production.

11. A process for producing a polycrystalline granulated silicon consisting essentially of particles which have a surface roughness $R_a$ of less than 150 nm, a density of greater than 99.9% of a theoretical solid density of silicon, and a pore content of less than 0.1%; said process comprising the steps of introducing seed crystals of silicon into a fluidized bed;

fluidizing the fluidized bed by a silicon-free fluidizing gas;

heating the fluidized bed by means of thermal radiation to a reaction temperature of between 700 and 1200° C.; and injecting a silicon-containing reaction gas into the hot fluidized bed above an inert gas feed by means of nozzles, so that so as to form a said polycrystalline granulated silicon by depositing silicon on the seed crystals.

\* \* \* \* \*